United States Patent [19]

Lew

[11] Patent Number: 4,840,071
[45] Date of Patent: Jun. 20, 1989

[54] CONVECTIVE ATTENUATION FLOWMETER

[76] Inventor: Hyok S. Lew, 7890 Oak St., Arvada, Colo. 80005

[21] Appl. No.: 163,855

[22] Filed: Mar. 3, 1988

Related U.S. Application Data

[63] Continuation-in-part of Ser. No. 71,777, Jul. 10, 1987, and a continuation-in-part of Ser. No. 78,206, Jul. 27, 1987, and a continuation-in-part of Ser. No. 88,571, Aug. 24, 1987.

[51] Int. Cl.$^4$ .............................................. G01F 1/84
[52] U.S. Cl. ............................................. 73/861.38
[58] Field of Search .................... 73/861.37, 861.38

[56] References Cited

U.S. PATENT DOCUMENTS

| | | | |
|---|---|---|---|
| 3,080,750 | 3/1963 | Wiley et al. | 73/861.3 |
| 3,218,851 | 11/1965 | Sipin | 73/861.3 |
| 4,096,745 | 6/1978 | Riukin et al. | 73/861.3 |
| 4,444,059 | 4/1984 | Smith | 73/861.3 |
| 4,470,294 | 9/1984 | Hamel | 73/861.37 |
| 4,622,858 | 11/1986 | Mizerak | 73/861.38 |

*Primary Examiner*—Herbert Goldstein

[57] ABSTRACT

The flowmeter of the present invention comprises at least one conduit with the two extremities respectively connected to an inlet and outlet legs, an electromagnetic vibrator generating flexural vibrations of the conduit, and a motion detector detecting the flexural vibrations of the conduit, wherein the flexural vibration of the conduit has amplitude increasing from one extremity to the other extremity of the conduit. The media moving through the conduit carries away energy and momentum belonging to the flexural vibrations of the conduit and, consequently, attenuate the flexural vibrations at a higher rate compared with the flexural vibration of a conduit containing stationary media. The mass flow rate of media moving through the conduit is determined from the convective portion of attenuation of the intermittently imposed flexural vibrations, or from the convective portion of the decrease of the kinetic energy of the continuously imposed flexural vibrations.

9 Claims, 3 Drawing Sheets (a) U = 0      (b) U ≠ 0

(a)      (b) U = 0 → ← U ≠ 0

CONVECTIVE ATTENUATION FLOWMETER

This patent application is a continuation-in-part application to Ser. No. 071,777 entitled "Convective attenuation flowmeter" filed on July 10, 1987, Ser. No. 078,206 entitled "Convective inertia force flowmeter" filed on July 27, 1987 and Ser. No. 088,571 entitled "Torsional vibration convective inertia force flowmeter" filed on Aug. 24, 1987.

BACKGROUND OF THE INVENTION

In recent years, the mass flow measurement technology measuring mass flow rates without relying on a side effect of the mass flow such as the convective heat transfer or the absorption of radiation has been developed. The mass flowmeter called Coriolis force flowmeter measures mass flow rate based on a mechanical effect directly associated with the mass flow rate. While the Coriolis force flowmeter represents a land mark progress in the mass flow measurement technology, it has many short comings such as its inability to measure low mass flow rates and the far too high cost. The present invention teaches a new and powerful principle in the mass flow measurement technology, which provides an economic mass flowmeter capable of measuring low mass flow rates.

BRIEF SUMMARY OF THE INVENTION

The primary object of the present invention is to provide a mass flowmeter comprising at least one vibrating conduit connected to an inlet and outlet leg, an electromagnetic vibrator generating flexural vibrations of the vibrating conduit, and a motion detector detecting the flexural vibrations, wherein the amplitude of the flexural vibrations increases from one extremity to the other extremity of the vibrating conduit.

Another object is to provide a mass flowmeter that determines mass flow rate through the vibrating conduit from the convective portion of the attenuation of the intermittently imposed flexural vibrations of the vibrating conduit, which convective portion caused by the media moving through the vibrating conduit occurs in addition to the vicous portion responsible for the attenuation of the intermittently imposed flexural vibrations of the vibrating conduit containing stationary media.

A further object is to provide a mass flowmeter that determines mass flow through the vibrating conduit from the convective portion of the decrease in the kinetic energy of the continuously imposed flexural vibrations of the vibrating conduit, which convective portion caused by media moving through the vibrating conduit occurs in addition to the viscous portion responsible for the damping of the continuously imposed flexural vibrations of the vibrating conduit containing stationary media.

Yet another object is to provide a mass flowmeter wherein the convective portion of the attenuation of the intermittently imposed flexural vibrations or the convective portion of the dissipation of the continuously imposed flexural vibrations is determined by taking off the viscous portion thereof stored in a data processor from the measured value thereof.

Yet a further object is to provide a mass flowmeter comprising a pair of the vibrating conduits disposed in a parallel arrangement, wherein mass flow rate is determined from the convective portion of the attenuation or the convective portion of the dissipation obtained by comparing the attenuations or dissipations of the flexural vibrations of the pair of vibrating conduits to one another.

Still another object is to provide a mass flowmeter comprising two vibrating conduits disposed in a series arrangement, wherein mass flow rate is determined from the convective portion of the attenuation or the convective portion of the dissipation obtained by comparing the attenuations or the dissipations of the flexural vibrations of the two vibrating conduits to one another.

Still a further object is to provide a mass flowmeter comprising a pair of parallel vibrating conduits connected to a third vibrating conduit in series, wherein mass flow rate is determined by comparing the attenuations or the dissipations of the flexural vibrations of at least one of the pair of parallel vibrating conduits and the third vibrating conduit to one another.

Yet still another object is to provide a mass flowmeter comprising a pair of parallel vibrating conduits connected to a third vibrating conduit in series, wherein mass flow rate is determined by analizing the attenuations or the dissipations of the flexural vibrations of the three vibrating conduits.

Yet still a further object is to provide a mass flowmeter of superb sensivity and high reliability, which is economic and practical.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
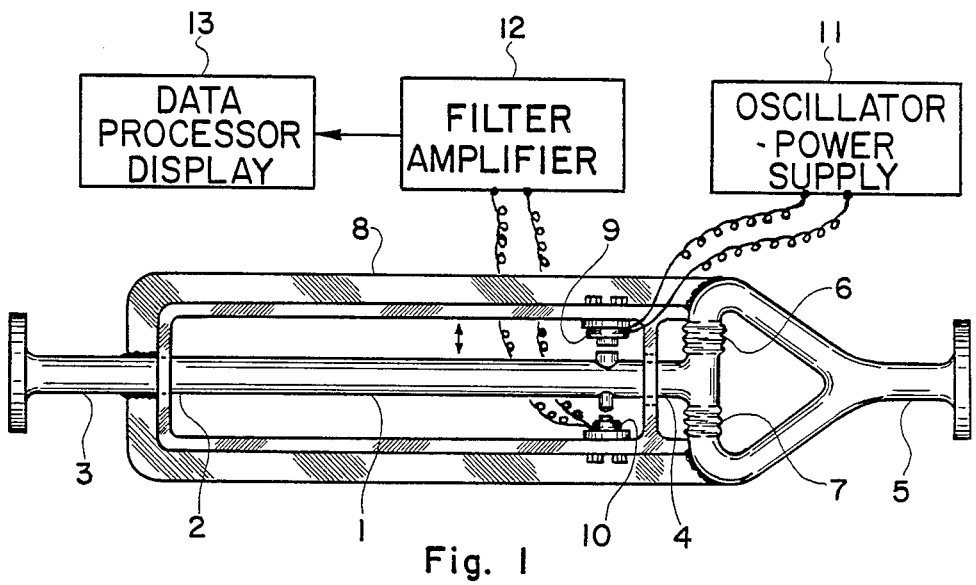
FIG. 1 illustrates an embodiment of the mass flowmeter of the present invention employing a single vibrating conduit.

In FIG. 1 there is illustrated a fundamental embodiment employing the mass flowmeter principles of the present invention, which embodiment includes a vibrating conduit 1 with one extremity 2 fixedly connected to a first port leg 3 and the other extremity 4 connected to a Y-shaped second port leg 5 in a laterally flexible arrangement by a T-shaped coupling including a pair of flexible bellow couplings 6 and 7. The extremity 2 of the vibrating conduit 1 and the Y-shaped port leg 5 are rigidly anchored to a rigid frame 8. The vibrating means or electromagnetic vibrator 9 secured to the frame 8 generates flexural vibrations of the vibrating conduit 1, which flexural vibrations have amplitude increasing from the fixed extremity 2 to the flexible extremity 4, while a motion detector 10 secured to the frame 8 detects the flexural vibrations of the vibrating conduit 1. The motion detector 10 may be an acceleration detector secured to the vibrating conduit 1 instead of a motion detector secured to the frame 8. The oscillator power supply 11 provides electric currents energizing the electromagnetic vibrator 9 in the form of pulses or continuous alternating currents, which intermittently induces the flexural vibrations or continuously excites the flexural vibrations. The electro-motive forces from the motion detector 10 generated by the flexural vibrations are conditioned by a filter-amplifier 12 and processed by a data processor 13 that provides information related to the mass flow rate of media moving through the vibrating conduit.

The convective attenuation or convective dissipation flowmeter of the present invention operates in the following principles: The kinetic energy influx carried in by the fluid entering the fixed extremity 2 of the vibrating conduit 1 is equal to $$\dot{E}_{IN} = \frac{1}{2} \rho U^3 A, \quad (1)$$

while the kinetic energy flux carried away by the fluid leaving the flexible extremity 4 of the vibrating conduit 1 is equal to $$\dot{E}_{OUT} = \left( \frac{1}{2} \rho U^2 + \frac{1}{2} C_1 \rho v^2 \right) UA, \quad (2)$$

where $\rho$ is the density of the fluid, U is the flow velocity, A is the cross section area of the flow passage through the vibrating conduits and v is the peak value of velocity of the flexural vibrations. The constant $C_1$ is a coefficient of proportionality that quantifies the amount of the kinetic energy associated with flexural vibrations transported away by the fluid leaving the vibrating conduit. The net amount of the kinetic energy carried away from the vibrating conduit 1 by the fluid flowing therethrough per unit time is equal to the difference between equations (1) and (2)

$$\left. \frac{dE}{dt} \right)_{CONV.} = \frac{1}{2} C_1 \rho v^2 UA. \quad (3)$$

The energy loss per unit time from the vibrating conduit 1 due to frictions associated with the viscoelasticity of the vibrating conduit 1 and the viscosity of the fluids contained therein and that surrounding thereof is proportional to the square of the velocity of the flexural vibrations and can be expressed in the form, $$\left. \frac{dE}{dt} \right)_{VISC.} = C_2 \mu v^2, \quad (4)$$

where $C_2$ is a constant of proportionality and $\mu$ is the total dynamic viscosity representing the total viscous energy dissipation. The kinetic energy belonging to the flexural vibrations of the vibrating conduit 1 is equal to $$E = \frac{1}{2} C_3 M v^2, \quad (5)$$

where $C_3$ is a constant or proportionality and M is the mass of the vibrating conduit and that of the fluid contained therein. The time rate of the decrease in the kinetic energy given by equation (5) is equal to the the total time rate of energy loss that is equal to the sum of equations (3) and (4), which kinetic energy balance provides relationship $$\frac{dv}{dt} = \left( \frac{1}{2M} \frac{C_1}{C_3} \rho UA + \frac{1}{M} \frac{C_2}{C_3} \mu \right) v. \quad (6)$$

The differential equation (6) has a solution $$v = v_0 \exp. \left[ -(K_1 + K_2 \rho UA)t \right], \quad (7)$$

where $v_0$ is the initial peak value, $$K_1 = \frac{1}{M} \frac{C_2}{C_3}, \quad K_2 = \frac{1}{2M} \frac{C_1}{C_3},$$

and t is time. It should be mentioned that equation (7) represents the attenuation of the flexural vibrations of the vibrating conduit with fluid flowing from the first extremity 2 to the second extremity 3. When the flow direction is reversed, the equation governing the attenuation can be written in the form $$v = v_0 \exp\left[-(K_1 + K_3 \rho U A)t\right], \quad (8)$$

where $K_3$ is another constant that is different from $K_2$ because the numerical value of the coefficient $C_1$ appearing in equations (2) and (3) has different value depending on the direction of the fluid flow.

Figure 2:
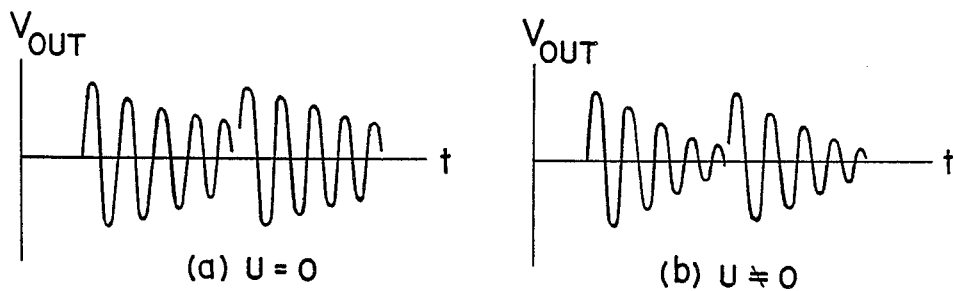
FIG. 2 illustrates typical attenuation of the flexural vibrations of the vibrating conduit containing stationary media and moving media therein.

There is illustrated the attenuation of the intermittently induced flexural vibrations of the vibrating conduit 1 containing the stationary fluid of zero velocity in FIG. 2-(a), while FIG. 2-(b) illustrates the attenuation of the vibrating conduit 1 containing moving fluid at flow velocity U. It is readily recognized that the constant $K_1$ in equation (7) can be determined empricially from the attenuation of flexural vibrations of the vibrating conduit containing stationary fluid, while $K_2$ is determined empirically from the attenuation of flexural vibrations of the vibrating conduit containing fluid moving at a known velocity. Once those empirically determined values of $K_1$ and $K_2$ or $K_1$ and $K_3$ are substituted into equation (7) or (8), the mass flow rate $\rho UA$ is readily determined by analizing the attenuation of the flexural vibrations given by equation (7) or (8), which are analized by the data processor 13.

The time rate of total energy loss from the continuously excited flexural vibrations of the vibrating conduit 1 is equal to the sum of the equations (3) and (4), $$\frac{dE_{OUT}}{dt} = \left(\frac{1}{2} C_1 \rho UA + C_2 \mu\right) v^2, \quad (9)$$

The output electromotive force $V_{OUT}$ from the motion detector 10 is proportional to the vibration velocity v of the flexural vibrations and, consequently, equation (9) can be written in the form:

$$\frac{dE_{OUT}}{dt} = C_4 \left(\frac{1}{2} C_1 \rho UA + C_2 \mu\right)(V_{OUT})^2, \quad (10)$$

where $\sqrt{C_4}$ is conversion factor between the vibration velocity v and the output emf $V_{OUT}$. The time rate of electrical energy converted to the mechanical energy of the vibrating conduit, which is supplied to the electromagnetic vibrator 9 in the form of continuous alternating currents, can be expressed in the form $$\frac{dE_{IN}}{dt} = C_5 (V_{IN})^2, \quad (11)$$

where $V_{IN}$ is the peak value of the alternating emf supplied to the electromagnetic vibrator 9 and $C_5$ is a constant of proportionality. The balance between the energy output and input respectively given by equations (10) and (11) yields relationship $$\rho UA = \frac{2C_5}{C_1 C_4} \left(\frac{V_{IN}}{V_{OUT}}\right)^2 - 2C_2\mu. \quad (12)$$

It is easy to recognize that equation (12) can be written in the form $$\rho UA = G_1 \left[\left(\frac{V_{IN}}{V_{OUT}}\right)^2 - \left(\frac{V_{IN}}{V_{OUT}}\right)^2_{U=0}\right], \quad (13)$$

where $$G_1 = \frac{2C_5}{C_1 C_4}$$

and the subscript U=0 stands for the values corresponding to zero fluid velocity. For the fluid flow moving in direction opposite to the case governed by equation (13), the mass flow rate is given by equation $$\rho UA = G_2 \left[\left(\frac{V_{IN}}{V_{OUT}}\right)^2 - \left(\frac{V_{IN}}{V_{OUT}}\right)^2_{U=0}\right], \quad (14)$$

Once the coefficient $G_1$, $G_2$ and the ratio of emf input to output corresponding to zero flow are determined empirically, the mass flow rate is determined from equation (13) or (14).

Figure 3:
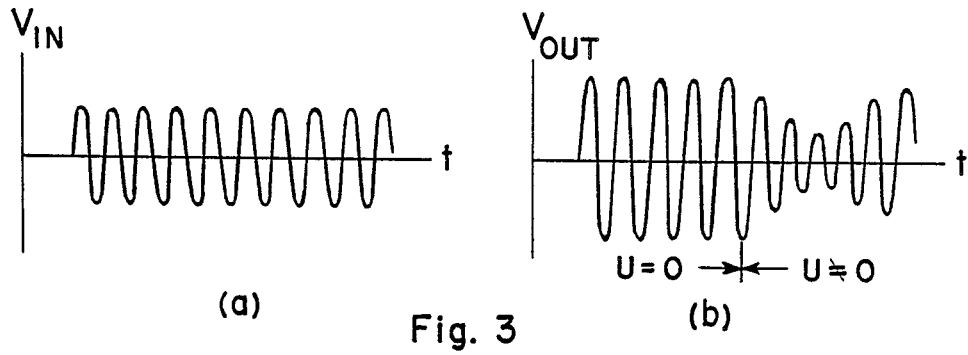
FIG. 3 illustrates typical dissipation of the flexural vibrations of the vibrating conduit containing stationary media and moving media.

There is illustrated the input emf of constant amplitude supplied to the electromagnetic vibrator 9 in the form of continuous alternating currents in FIG. 3-(a). The output emf from the motion detector 10 that varies as a function of the mass flow rate is illustrated in FIG. 3-(b). The data processor 13 having equations (13) and/or (14) programmed and stored therein determines the mass flow rate by analizing the output emf generated by the motion detector.

Figure 4:
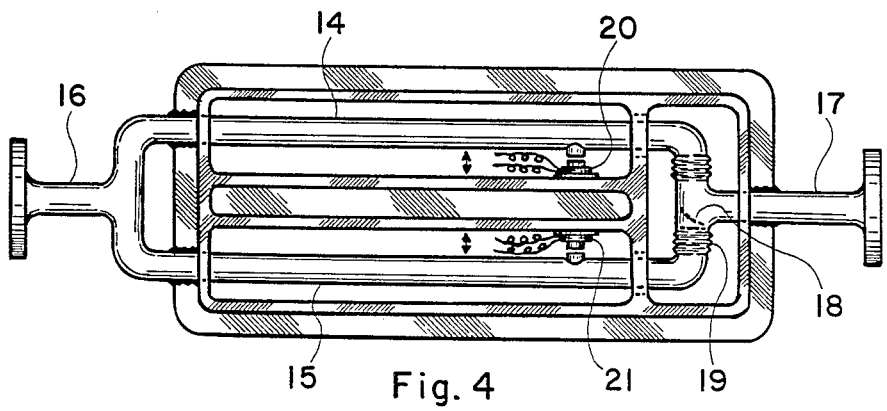
FIG. 4 illustrates an embodiment of the mass flowmeter comprising two parallel vibrating conduits arranged in a symmetric relationship, wherein media flow through only one of the two vibrating conduits.

In FIG. 4 there is illustrated am embodiment of the mass flowmeter of the present invention, which includes means for determining the numerical value of $K_1$ appearing in equation (7) and (8), or the numerical value of $(V_{IN}/V_{OUT})_{U=0}$ appearing in equation (13) and (14) on a real time basis. The mass flowmeter comprises a pair of identical vibrating conduits having the same construction as the vibrating conduit 1 described in conjunction with FIG. 1, which pair of the vibrating conduits 14 and 15 disposed in a parallel relationship are respectively connected to a first port leg 16 in a fixed arrangement and to a second port leg 17 in a laterally flexible arrangement. The first vibrating conduit 14 provides a flow passage connecting the two port legs 16 and 17 to one another, while the second vibrating conduit 15 is blocked by a plug 18 at a downstream of the flexible coupling 19. The electromagnetic vibrator and the motion detector are integrated into a dual function vibrator-detector 20 or 21. The flexural vibration of the first vibrating conduit 14 containing moving fluid provides information of total attenuation or dissipation resulting from the convective and viscous energy dissipation, while that of the second vibrating conduit 15 containing stationary fluid provides information on attenuation or dissipation resulting from the viscous energy dissipation only. The net convective attenuation or convective dissipation is determined by combining the attenuation data of the two vibrating conduits 14 and 15. The mass flow rate is determined from the net convective attenuation of the intermittently imposed flexural vibrations per equations (7) or (8), or from the net convective dissipation of the continuously excited flexural vibrations per equation (13) or (14).

Figure 5:
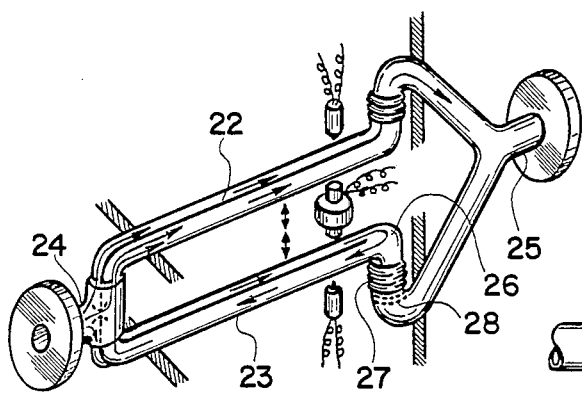
FIG. 5 illustrates an embodiment of the mass flowmeter comprising two parallel vibrating conduits arranged in a symmetric relationship, wherein net flow of media occurs in only one of the two vibrating conduits, while the media is circulated through the other vibrating conduit without a net flow therethrough.

In FIG. 5 there is illustrated an embodiment of the mass flowmeter comprising a pair of parallel vibrating legs 22 and 23 having identical flexural vibration characteristics, wherein each of the two vibrating legs includes two separate and parallel conduits affixed to one another. Both conduits included in the first vibrating leg 22 are open for the fluid flow between the first and second port legs 24 and 25, while the two conduits included in the second vibrating leg 23 are open to one another by an opening 26 disposed at an upstream section of the flexible coupling 27 connecting the vibrating leg 23 to the second port leg 25. The downstream section of the flexible coupling 27 is blocked by a plug 28 and, consequently, there is no net flow through the second vibrating leg 23. While this embodiment of the mass flowmeter operates on the same principles as that shown in FIG. 4, it provides an advantage in view that the fluid circulated through the second vibrating leg 23 prevents the accumulation of the stale fluid therein and, consequently, the two vibrating legs are more closely matched in terms of dynamic characteristics.

Figure 6:
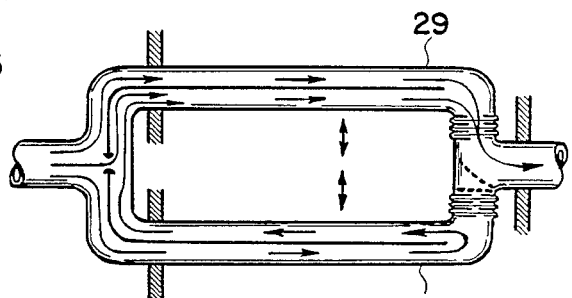
FIG. 6 illustrates another embodiment similar to that shown in FIG. 5.

In FIG. 6 there is illustrated an embodiment essentially the same as that shown in FIG. 5 with one exception being that the two separate conduits included in each of the two vibrating legs 29 and 30 are disposed on a plane including the two vibrating legs 29 and 30, while those included in the two vibrating legs of the embodiment shown in FIG. 5 are disposed on a plane perpendicular to the plane including the two vibrating legs 22 and 23. For the brevity of the illustration, the electromagnetic vibrators and the motion detectors are not shown in this embodiment.

Figure 7:
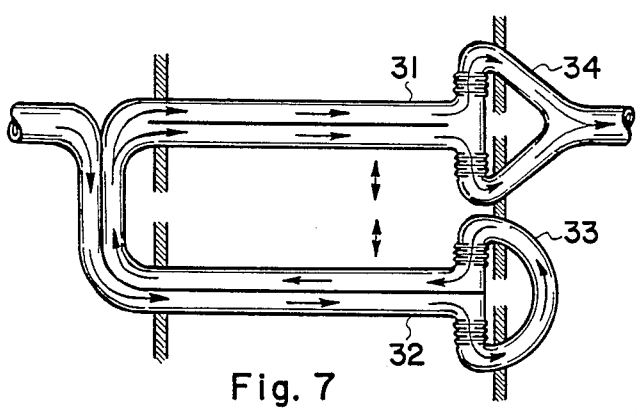
FIG. 7 illustrates a further embodiment similar to that shown in FIG. 5.

In FIG. 7 there is illustrated an embodiment of the mass flowmeter comprising a pair of parallel vibrating legs 31 and 32 having the same flexural vibration characteristics, wherein each of the two vibrating legs has two separate and parallel conduits affixed to one another. There is no net fluid flow through the second vibrating leg 32 as the fluid flowing through the first conduit included therein doubles back through the second conduit therein after moving through the 180 degree turn loop 33 with two extremities respectively connected to the two conduits included in the second vibrating leg 32 by a a pair of flexible couplings. The fluid flow leaving the second conduit of the second vibrating leg 32 bifurcates and flows through the two conduits included in the first vibrating leg 31 which is connected to a Y-shaped port leg 34 by a pair of flexible couplings. According to equations (7) and (8), the attenuation of the flexural vibrations of the two vibrating legs 31 and 32 are respectively given by equations $$v_1 = v_{10} \exp. [-(K_1 + K_2 \rho UA)t], \text{ and} \tag{15}$$

$$v_2 = v_{20} \exp. \left[ -\left( K_1 + \frac{K_2 - K_3}{2} \rho UA \right) t \right]. \tag{16}$$

The mass flow rate is determined from equations (15) and (16) with empirically determined values of $K_2$ and $K_3$ after eliminating $K_1$ therebetween.

Figure 8:
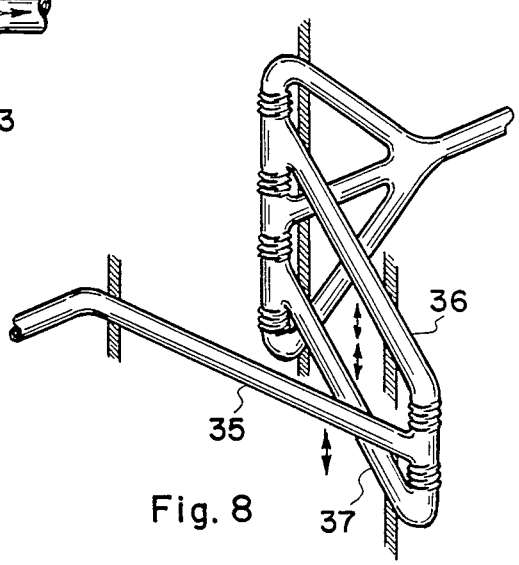
FIG. 8 illustrates an embodiment of the mass flowmeter comprising a pair of parallel vibrating conduits connected to a third vibrating conduit in series.

In FIG. 8 there is illustrated an embodiment of the mass flowmeter comprising a first vibrating conduit 35 connected in series to a pair of parallel vibrating conduits 36 and 37, wherein those vibrating conduits have the same flexural vibration characteristics. The attenuations of the flexural vibrations of the three vibrating conduits 35, 36 and 37 are respectively given by equations $$v_1 = v_{10} \exp. [-(K_1 + K_2 \rho UA)t], \tag{17}$$

$$v_2 = v_{20} \exp. [-(K_1 + K_2 \rho U_2 A)t], \tag{18}$$

and $$v_3 = v_{30} \exp. [-(K_1 + K_2 \rho U_3 A)t]. \tag{19}$$

Since $U = U_2 + U_3$, equations (18) and (19) can be combined to obtain equation $$\sqrt{v_2 v_3} = \sqrt{v_{20} v_{30}} \exp. \left[ -\left( K_1 + \frac{1}{2} K_2 \rho UA \right) t \right]. \tag{20}$$

Equations (17) and (20) provides equation $$\frac{v_1}{\sqrt{v_2 v_3}} = \frac{v_{10}}{\sqrt{v_{20} v_{30}}} \exp. \left( -\frac{1}{2} K_2 \rho UAt \right), \tag{21}$$

which equation determines the mass flow rate $\rho UA$ when the empirically determined values of $K_2$ is substituted thereinto. If the fluid flow bifurcates equally into the two parallel vibrating conduits, $\sqrt{v_2 v_3}$ appearing in equation (21) may be replaced by $v_2$ or $v_3$, and $\sqrt{v_{20} v_{30}}$ by $v_{20}$ or $v_{30}$.

Figure 9:
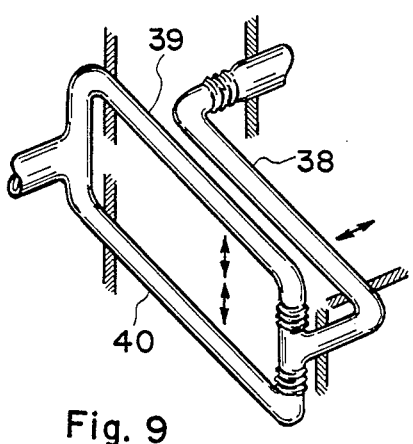
FIG. 9 illustrates another embodiment similar to that shown in FIG. 8.

In FIG. 9 there is illustrated another embodiment of the mass flowmeter comprising a first vibrating conduit 38 connected in series to a pair of parallel vibrating conduits 39 and 40, which combination has construction similar to and operates on the same principles as that of FIG. 8.

Figure 10:
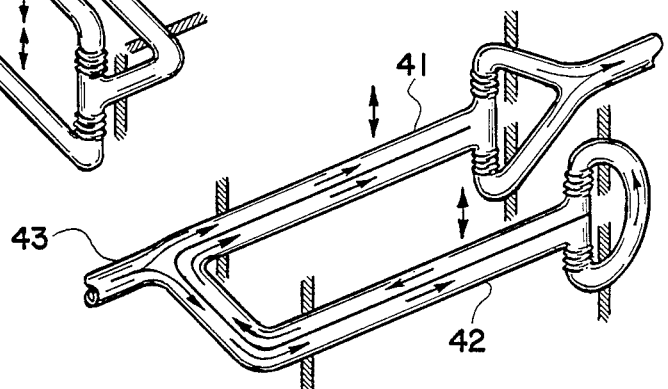
FIG. 10 illustrates an embodiment of the mass flowmeter comprising two parallel vibrating conduits arranged in a symmetric relationship, wherein one of the two vibrating conduit includes a by-pass loop with zero net flow therethrough.

In FIG. 10 there is illustrated an embodiment of the mass flowmeter comprising two parallel vibrating legs 41 and 42, each of which includes two separate parallel conduits affixed to one another. The fluid flow leaving the first port leg 43 bifurcates into two separate streams respectively joining the two first conduits respectively included in the two vibrating legs. The flow moving through the first conduit of the second vibrating leg 42 doubles back through the second conduit thereof and then flows through the second conduit of the first vibrating leg. The attenuation of flexural vibrations of the two vibrating legs 41 and 42 are respectively given by equations $$v_1 = v_{10} \exp. [-(K_1 + K_2 \rho UA)t], \tag{22}$$

and $$v_2 = v_{20} \exp. \{-[K_1 + (K_2 K_3) \rho U_1 A]t\}. \tag{23}$$

If $K_2$ and $K_3$ are closely matched and $U_1$ is much smaller than U, equation (23) is approximated by equation $$v_2 \approx v_{20} \exp. (-K_1 t). \tag{24}$$

The mass flow rate $\rho UA$ is determined from equation (22) with empirically determined value of $K_2$ and value of $K_1$ determined from equation (24).

Figure 11:
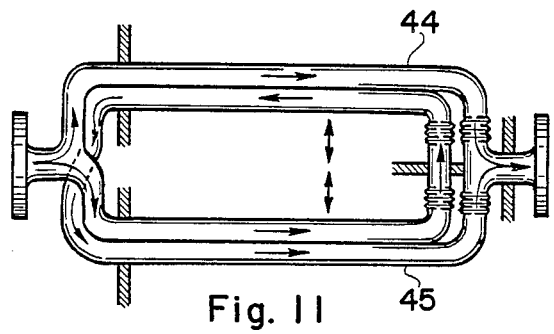
FIG. 11 illustrates an embodiment of the mass flowmeter comprising two parallel vibrating conduits arranged in a symmetric relationship, which includes a by-pass loop constituting one half of both vibrating conduits.

In FIG. 11 there is illustrated another embodiment of the mass flowmeter with a pair of parallel vibrating legs 44 and 45 of identical flexural vibration characteristics, which has a construction similar to and operates on the same principles as that shown in FIG. 10.

Figure 12:
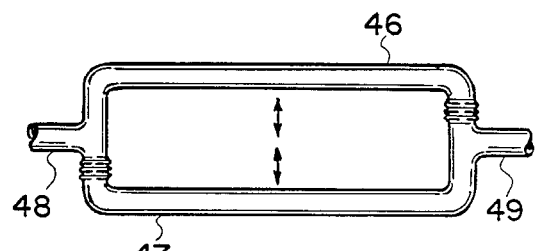
FIG. 12 illustrates an embodiment of the mass flowmeter comprising two parallel vibrating conduits arranged in an antisymmetric relationship.

In FIG. 12 there is illustrated an embodiment of the mass flowmeter comprising a pair of parallel vibrating conduits 46 and 47 wherein the first extremity of the first vibrating conduit 46 is fixedly connected to a first port leg 48 and the second extremity is flexibly connected to a second port leg 49, while the first extremity of the second vibrating conduit 47 is flexibly connected to the first port leg 48 and the second extremity is fixedly connected to the second port leg 49. The attenuation of the flexural vibration of the two vibrating legs 46 and 47 are respectively by equations $$v_1 = v_{10} \exp[-(K_1 + \tfrac{1}{2}K_2\rho UA)t], \quad (25)$$

and $$v_2 = v_{20} \exp[-(K_1 + \tfrac{1}{2}K_3\rho UA)t]. \quad (26)$$

The mass flow rate is determined from equations (25) and (26) with empirically determined values of $K_2$ and $K_3$ after eliminating $K_1$ there between.

Figure 13:
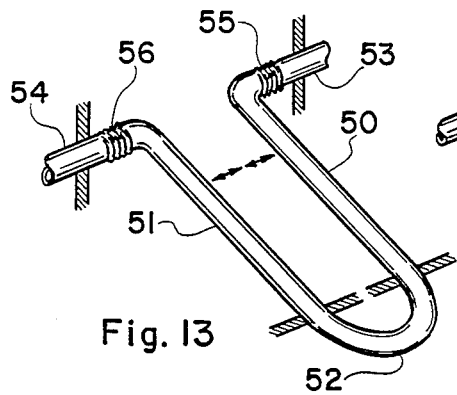
FIG. 13 illustrates an embodiment of the mass flowmeter comprising two vibrating conduits arranged in series in a symmetric arrangement about a plane intermediate the two vibrating conduits.

In FIG. 13 there is illustrated an embodiment of the mass flowmeter including two vibrating conduits 50 and 51 connected to one another in series by a U-shaped conduit section 52 and respectively connected to two port legs 53 and 54 by a pair of flexible couplings 55 and 56. The equations governing the attenuation of the flexural vibrations of the two vibrating conduits 50 and 51 are the same as equations (25) and (26) with one exception being that $\tfrac{1}{2}K_2$ and $\tfrac{1}{2}K_3$ therein are now replaced by $K_2$ and $K_3$ respectively, from which equations the mass flow rate is obtained after eliminating $K_1$ therebetween.

Figure 14:
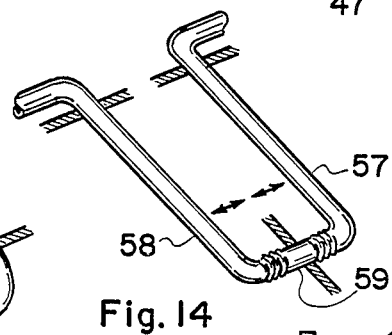
FIG. 14 illustrates another embodiment similar to that shown in FIG. 13.

In FIG. 14 there is illustrated another embodiment of the mass flowmeter comprising two vibrating conduits 57 and 58 connected to one another by a coupling conduit 59 including two flexible couplings at the two extremities thereof, which embodiment operates on the same principles as that of FIG. 13.

Figure 15:
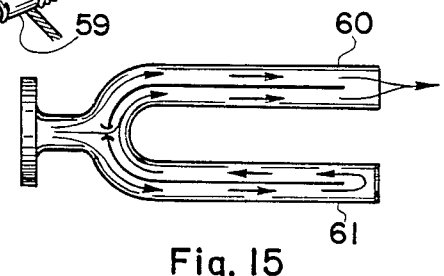
FIG. 15 illustrates an embodiment of the nozzle type mass flowmeter.
Figure 16:
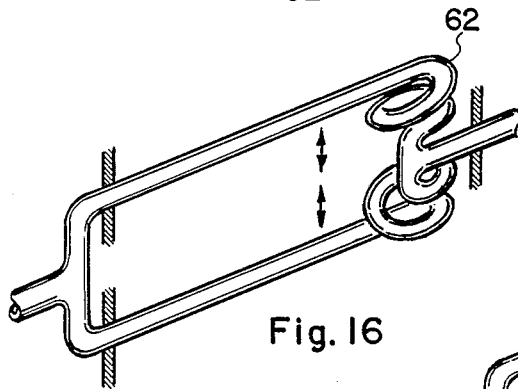
FIG. 16 illustrates an orthogonal coil loop employed in place of the bellow type flexible coupling connecting one extremity of the vibrating conduit to a port leg in a laterally flexible arrangement.
Figure 17:
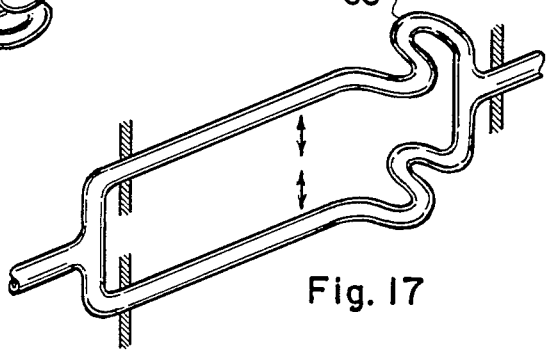
FIG. 17 illustrates an overhanging loop employed in place of the bellow type flexible coupling connecting one extremity of the vibrating conduit to a port leg in a laterally flexible arrangement.
Figure 18:
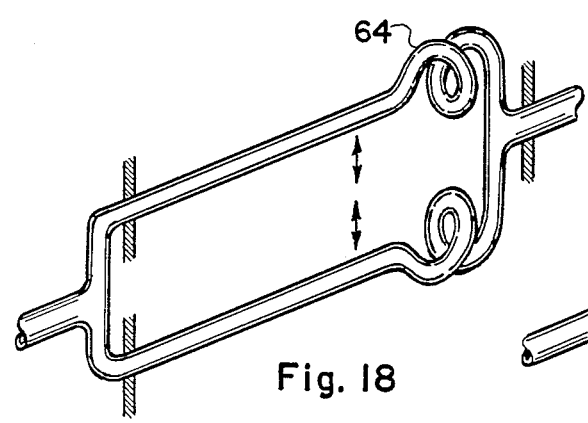
FIG. 18 illustrates a parallel coil loop employed in place of the bellow type flexible coupling connecting one extremity of the vibrating conduit to a port leg in a laterally flexible arrangement.
Figure 19:
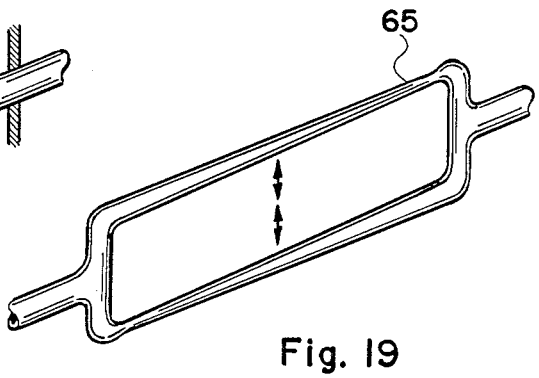
FIG. 19 illustrates a tapered conduit without a flexible coupling section employed as the vibrating conduit.

In FIG. 15 there is illustrated an embodiment of the nozzle type mass flowmeter comprising two parallel vibrating cantilever legs 60 and 61, each of which two vibrating legs include two parallel conduits affixed to one another. There is no net fluid flow through the second vibrating leg 61 as described in conjunction with the embodiment shown in FIG. 5. This nozzle type mass flowmeter operates on the same principles as that described in conjunction with the embodiment shown in FIG. 4 or 5. It is readily recognized that a nozzle type mass flowmeter can be constructed in an arrangement which employs one open vibrating cantilever conduit and one closed vibrating cantilever conduit as suggested by the embodiment shown in FIG. 4.

The mass flowmeter comprising a pair of parallel vibrating conduits or legs also determines the mass flow rate from the convective dissipations of the continuously excited flexural vibrations of the two vibrating conduits or legs respectively given by equations $$\rho U_1 A = G_1 \left[ \left(\frac{V_{IN}}{V_{OUT}}\right)_1^2 - \left(\frac{V_{IN}}{V_{OUT}}\right)_{U=0}^2 \right], \text{ and} \quad (27)$$

$$\rho U_2 A = G_2 \left[ \left(\frac{V_{IN}}{V_{OUT}}\right)_2^2 - \left(\frac{V_{IN}}{V_{OUT}}\right)_{U=0}^2 \right]. \quad (28)$$

In embodiments shown in FIGS. 4, 5, 6, 7 and 15, $U_2 = 0$. Consequently, the mass flow rate $\rho UA$ is determined from equation (27) with empirically determined value of $G_1$ and value of $(V_{IN}/V_{OUT})_{U=0}^2$ determined from equation (28) with empirically determined value of $G_2$. In embodiments shown in FIGS. 12, 13 and 14, $U_1 = 2$ and $G_1 = G_2$. Consequently, equations (27) and (28) with empirically determined values of $G_1$ and $G_2$ can be simultaneously solved for $U_1$ and $_2$.

The mass flowmeter comprising a pair of parallel vibrating conduits connected to a third vibrating conduit in series as shown in FIGS. 8 and 9 provides two equations respectively governing the convective dissipation of the flexural vibrations of one of the two parallel vibrating conduits and the third vibrating conduit $$\tfrac{1}{2}\rho UA = G_1 \left[ \left(\frac{V_{IN}}{V_{OUT}}\right)_1^2 - \left(\frac{V_{IN}}{V_{OUT}}\right)_{U=0}^2 \right], \text{ and} \quad (29)$$

$$\rho UA = G_1 \left[ \left(\frac{V_{IN}}{V_{OUT}}\right)_2^2 - \left(\frac{V_{IN}}{V_{OUT}}\right)_{U=0}^2 \right]. \quad (30)$$

Simultaneous solution of equations (29) and (30) for $\rho UA$ determines mass flow rate.

The flexible coupling connecting one extremity of the vibrating conduit or leg to a port leg rigidly anchored to a rigid frame may be a flexible bellow couplings employed in embodiments shown in FIGS. 4–14 or other types of flexible coupling that provides a higher amplitude in the flexural vibrations at the extremity including the flexible coupling compared with the amplitude at sections adjacent to the fixedly coupled extremity. A few examples of the flexible coupling usable in conjunction with the mass flowmeter of the present invention in place of the flexible bellow coupling are shown in FIGS. 16, 17, 18 and 19, which respectively illustrates a coiled loop of conduit 62 with central axis perpendicular to the vibrating leg, a S-shaped loop of conduit 63 disposed on a plane perpendicular to the direction of the flexural vibration, a coiled loop of conduit 64 with central axis parallel to the vibrating leg, and a tapered conduit that provides a flexural vibrations of a higher amplitude at sections of smaller diameter 65.

While the principles of the present invention have now been made clear by the illustrative embodiments there will be immediately obvious to those skilled in the art many modifications of the structures, arrangements, proportions, elements and materials which are particularly adapted to the specific working environments and operating conditions in the practice of the invention without departing from those principles. It is not desired to limit the inventions to the particular illustrated embodiments shown and described and, accordingly, all suitable modifications and equivalents may be restored to falling within the scope of the inventions as defined by the claims which follow.

The methods and embodiments of the invention, in which an exclusive property or priviledge is claimed, are defined as follow:

1. An apparatus for measuring mass flow rate comprising in combination:
   (a) at least one elongated member including at least one flow passage with one extremity secured to a support to restrain lateral movement thereof and the other extremity disposed in a laterally flexible arrangement;
   (b) another elongated member including at least two flow passages with one extremity secured to the support to restrain lateral movement thereof and the other extremity disposed in a laterally flexible arrangement, wherein said two flow passages are connected to one another alowing media to circulate therethrough under zero net flow condition;
   (c) means for imposing flexural vibrations on said one and another elongated members;
   (d) first means for determining time rate of loss of momentum associated with the flexural vibration of said one elongated member from said one elongated member; and
   (e) second means for determining time rate of loss of momentum associated with the flexural vibration of said another elongated member from said another elongated member;
   wherein mass flow rate of media moving through said one elongated member is determined from the difference in the time rates of loss of momentum respectively determined by said first and second means for determining the time rate of loss of momentum.

2. The combination as set forth in claim 1 wherein said means for imposing flexural vibrations intermittently induce flexural vibrations of said one and another elongated members, and said first and second means for determining the time rate of loss of momentum respectively determine attenuation of the flexural vibrations of said one and another elongated members.

3. The combination as set forth in claim 1 wherein said means for imposing flexural vibrations continuously induce flexural vibrations of said one and another elongated members with an energy imput rate of known amount, and said first and second means for determining the time rate of loss of momentum respectively determine levels of momentum of the flexural vibrations of said first and second elongated members.

4. The combination as set forth in claim 1 wherein one extremity and the other extremity of said one elongated member are respectively connected to a first and second port legs, and the media circulated through said another elongated member moves through the flow passage included in said one elongated member.

5. The combination as set forth in claim 4 wherein said the other extremity of said one elongated member includes at least one axially resilient coupling disposed in an angled arrangement with respect to said one elongated member.

6. The combination as set forth in claim 1 wherein said the other extremity of said one elongated member is terminated and the flow passage included in said one elongated member is open to ambient surroundings at said the other extremity, and said the other extremity of said another elongated member is terminated and closed wherein the two flow passages included in said another elongated member are open to one another at said the other extremity, and the media circulated through said another elongated member moves through the flow passage included in said one elongated member.

7. An apparatus for measuring mass flow rate comprising in combination:
   (a) a first conduit with one extremity connected to a first port leg in an arrangement restraining lateral movement thereof, and the other extremity connected to a second port leg by at least one axially resilient coupling disposed in an angled arrangement with respect to the first conduit;
   (b) a second conduit with one extremity connected to the first port leg in an arrangement restraining lateral movement thereof, and the other extremity connected to the second port leg by at least one axially resilient coupling disposed in an angled arrangement with respect to the second conduit, wherein second conduit is blocked to maintain the condition of zero net flow therethrough;
   (c) means for imposing flexural vibrations on said first and second conduits; and
   (d) first means for determining time rate of loss of momentum associated with the flexural vibrations of the first conduit; and
   (e) second means for determining time rate of loss of momentum associated with the flexural vibrations of the second conduit;
   wherein mass flow rate of media moving through the first conduit is determined from the difference in the time rates of loss of momentum respectively determined by said first and second means for determining the time rate of loss of momentum.

8. The combination as set forth in claim 7 wherein said means for imposing flexural vibrations intermittently induce flexural vibrations of the first and second conduits, and said first and second means for determining the time rate of loss of momentum respectively determine attenuation of the flexural vibrations of the first and second conduits.

9. The combination as set forth in claim 7 wherein said means for imposing flexural vibrations continuously induce flexural vibrations of the first and second conduits with an energy input rate of known amount, and said first and second means for determining the time rate of loss of momentum respectively determine levels of momentum of the flexural vibrations of the first and second conduits.

* * * * *